(12) United States Patent
Jin et al.

(10) Patent No.: US 9,074,089 B2
(45) Date of Patent: Jul. 7, 2015

(54) ACRYLATE-STYRENE-ACRYLONITRILE RESIN COMPOSITION HAVING THERMOCHROMIC RESISTANCE AT HIGH TEMPERATURES

(71) Applicant: Cheil Industries Inc., Kumi (KR)

(72) Inventors: Sung Hun Jin, Uiwang-si (KR); Woo Kyun Lee, Uiwang-si (KR); Jong Tae Yoon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 202 days.

(21) Appl. No.: 13/719,405

(22) Filed: Dec. 19, 2012

(65) Prior Publication Data

US 2013/0172485 A1    Jul. 4, 2013

(30) Foreign Application Priority Data

Dec. 28, 2011 (KR) ................ 10-2011-0144059

(51) Int. Cl.
| | |
|---|---|
| C08L 51/04 | (2006.01) |
| C08L 25/12 | (2006.01) |
| C08L 25/16 | (2006.01) |
| C08L 51/00 | (2006.01) |
| C08L 55/02 | (2006.01) |

(52) U.S. Cl.
CPC .............. *C08L 51/04* (2013.01); *C08L 25/16* (2013.01); *C08L 51/003* (2013.01); *C08L 55/02* (2013.01); *C08L 2205/02* (2013.01); *C08L 2205/03* (2013.01)

(58) Field of Classification Search
USPC ............................................. 525/85
See application file for complete search history.

(56) References Cited

U.S. PATENT DOCUMENTS

| | | | | |
|---|---|---|---|---|
| 4,524,166 A | * | 6/1985 | Spivack et al. ........... 524/117 |
| 4,774,287 A | * | 9/1988 | Shimozato et al. ....... 525/86 |
| 4,824,907 A | * | 4/1989 | Coster ..................... 525/86 |
| 5,889,111 A | * | 3/1999 | McKee et al. ........... 525/64 |

* cited by examiner

*Primary Examiner* — Jeffrey Mullis

(74) *Attorney, Agent, or Firm* — Additon, Higgins & Pendleton, P.A.

(57) ABSTRACT

An acrylate-aromatic vinyl-vinyl cyanide resin composition having thermochromic resistance at high temperatures is provided. The resin composition includes: (A) about 20 to about 50% by weight of acrylic graft copolymer; (B) about 20 to about 50% by weight of two types of aromatic vinyl-vinyl cyanide copolymers with different molecular weights; and (C) about 30 to about 50% by weight of alpha-methyl styrene terpolymer.

14 Claims, No Drawings

ACRYLATE-STYRENE-ACRYLONITRILE RESIN COMPOSITION HAVING THERMOCHROMIC RESISTANCE AT HIGH TEMPERATURES

CROSS-REFERENCE TO RELATED APPLICATION

This application claims priority under 35 USC Section 119 to and the benefit of Korea Patent Application No. 10-2011-0144059 filed Dec. 28, 2011, in the Korean Intellectual Property Office, the disclosure of which is incorporated herein by reference in its entirety.

FIELD OF INVENTION

The present invention relates to an acrylate-styrene-acrylonitrile (ASA) resin composition that can have thermochromic resistance.

BACKGROUND OF THE INVENTION

Generally, acrylonitrile-butadiene styrene-rubber (ABS) resin is widely used in electrical/electronic parts, home appliances, toy products, and office machines. ABS resins can have good processability attributed to styrene, strength and chemical resistant properties attributed to acrylonitrile, and high impact strength attributed to butadiene. ABS resins can also have a desirable appearance including gloss.

However, ABS resin contains chemically unstable double bonds in the rubber component of the resin, which can degrade upon prolonged exposure to ultraviolet (UV) radiation. Thus ABS resins can have poor weather resistance and light resistance. Therefore, when an ABS resin product is left outside for a long period, over time, discoloration and physical degradation occur, rendering the ABS resin product unsuitable for outdoor purposes. Post processing methods, such as coating or plating the ABS resin formed product, or addition of a large amount of stabilizers during the extrusion process of ABS resin, can be used to address this issue. However, the former is a complicated process with high defect rates, while the latter increases the production cost and cannot give satisfactory long term weather resistance.

To overcome the limitations of ABS resins, various weather resistant resins, such as acrylate-styrene-acrylonitrile resin CASA resin'), can be used instead of ABS resin.

Thermal resistance can also be important for various outdoor purposes, such as in automobiles. To acquire thermal resistance, α-methyl styrene, which is a styrene monomer with excellent heat resistance, and an excellent balance of physical properties and price, is widely used commercially. There is on-going research directed to heat resistant copolymers using α-methyl styrene.

For example, copolymers of vinyl cyanide and methyl styrene compounds can have excellent heat resistance. The use of such copolymers, however, can generate a large amount of gas, and thermochromism can occur easily.

SUMMARY OF THE INVENTION

The present invention provides an acrylate-aromatic vinyl-vinyl cyanide resin composition that can have excellent thermochromic resistance even at high temperatures. For ease of reference, the acrylate-aromatic vinyl-vinyl cyanide resin composition of the invention is also referred to herein as the ASA resin composition. The ASA resin composition of the invention can also have high impact strength and weather resistance. The present inventors have found that an ASA resin composition including two aromatic vinyl-vinyl cyanide copolymers with different molecular weights and an alpha-methyl styrene terpolymer can provide improved thermochromic resistance at high temperatures.

The ASA resin composition can include (A) about 20 to about 50% by weight of acrylic graft copolymer; (B) about 20 to about 50% by weight of two types of aromatic vinyl-vinyl cyanide copolymers having different molecular weights; and (C) about 30 to about 50% by weight of alpha-methyl styrene terpolymer, wherein the composition can have thermochromic resistance at high temperatures.

The acrylic graft copolymer (A) is prepared by copolymerizing about 40 to about 60% by weight acrylic rubber and about 60 to about 40% by weight monomer compounds that are grafted to the acrylic rubber including aromatic vinyl compound and vinyl cyanide compound. The monomer compounds of vinyl cyanide compound and aromatic vinyl compound that are grafted on the acrylic rubber can include about 20 to about 30% by weight vinyl cyanide compound and about 70 to about 80% by weight aromatic vinyl compound.

The acrylic rubber can be a C2 to C10 alkyl acrylate and can have an average rubber particle size of about 0.1 to about 0.5 μm.

Examples of the aromatic vinyl compound can include without limitation styrene, alpha-methyl styrene, p-methylstyrene, p-t-butylstyrene, 2,4-dimethylstyrene, chlorostyrene, vinyltoluene, vinylnaphthalene, and the like, and combinations thereof. Examples of the vinyl cyanide compound can include without limitation acrylonitrile, methacrylonitrile, and the like, and combinations thereof.

Each of the two types of aromatic vinyl-vinyl cyanide copolymers having different molecular weights (B) can include about 20 to about 35% by weight of vinyl cyanide compound and about 65 to about 85% by weight of aromatic vinyl compound. The aromatic vinyl-vinyl cyanide copolymer (B) can include (b1) a high molecular weight aromatic vinyl-vinyl cyanide copolymer with a weight-average molecular weight of about 130,000 to about 150,000 and (b2) a low molecular weight aromatic vinyl-vinyl cyanide copolymer with a weight-average molecular weight of about 80,000 to about 100,000.

The alpha-methyl styrene terpolymer (C) can be prepared by copolymerizing about 20 to about 40% by weight vinyl cyanide compound, about 10 to about 30% by weight styrene monomer, and about 40 to about 70% by weight alpha methyl styrene.

The ASA resin composition of the invention can further include about 5 to about 10 parts by weight of maleimide heat resistant copolymer (D), based on about 100 parts by weight of the acrylic graft copolymer (A), aromatic vinyl-vinyl cyanide copolymer (B), and alpha methyl styrene terpolymer (C).

The ASA resin composition can have a yellowness index change value (ΔYI) of less than about 7.0, as measured using a spectrocolorimeter in accordance with ASTM D-1925. The ΔYI can be measured using a specimen formed of the ASA resin composition having a thickness of 2.2 mm, a width of 10 mm, and a length of 6 mm prepared under a forming temperature of 250° C., a mold temperature of 70° C., and a cooling time of 300 seconds, wherein the specimen is maintained at a temperature of 250° C. for 10 minutes and wherein changes in yellow (ΔYI) are measured before and after the specimen is held at the temperature of 250° C. for 10 minutes.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Acrylic Graft Copolymer

The acrylic graft copolymer includes aromatic vinyl compound and vinyl cyanide compound grafted onto acrylic rubber. Acrylic graft copolymers are well known to the persons of ordinary skill in the art.

The acrylic rubber can be an alkyl acrylic rubber synthesized from C2 to C10 alkyl acrylate. The acrylic graft copolymer (A) can include the acrylic rubber in an amount of about 40 to about 60 wt %, based on the total weight of the acrylic graft copolymer (A). In some embodiments, the acrylic graft copolymer (A) can include the acrylic rubber in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the acrylic rubber can be in a range from about any of the foregoing amounts to about any other of the foregoing amounts.

The average particle size of the acrylic rubber can range from about 0.1 to about 0.5 µm, for example about 0.1 to about 0.3 µm.

The monomer compounds of vinyl cyanide compound and aromatic vinyl compound (also referred to herein as the monomer mixture or combination) copolymerized and grafted onto the acrylic rubber can include about 20 to about 30% by weight vinyl cyanide compound and about 70 to about 80% by weight aromatic vinyl compound, based on the total weight of the monomer compounds grafted onto the acrylic rubber.

In some embodiments, the monomer mixture including vinyl cyanide compound and aromatic vinyl compound copolymerized and grafted onto the acrylic rubber can include the vinyl cyanide compound in an amount of about 20, 21, 22, 23, 24, 25, 26, 27, 28, 29, or 30% by weight. Further, according to some embodiments of the present invention, the amount of the vinyl cyanide compound can be in a range from about any of the foregoing amounts to about any other of the foregoing amounts.

In some embodiments, the monomer mixture including vinyl cyanide compound and aromatic vinyl compound copolymerized and grafted onto the acrylic rubber can include the aromatic vinyl compound in an amount of about 70, 71, 72, 73, 74, 75, 76, 77, 78, 79, or 80% by weight. Further, according to some embodiments of the present invention, the amount of the aromatic vinyl compound can be in a range from about any of the foregoing amounts to about any other of the foregoing amounts.

The acrylic graft copolymer (A) can include about 40 to about 60% by weight of the monomer compounds including vinyl cyanide compound and aromatic vinyl compound that are grafted onto the acrylic rubber, based on the total weight of the acrylic graft copolymer (A). In some embodiments, the acrylic graft copolymer (A) can include the monomer compounds including vinyl cyanide compound and aromatic vinyl compound in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the monomer compounds including vinyl cyanide compound and aromatic vinyl compound can be in a range from about any of the foregoing amounts to about any other of the foregoing amounts.

Examples of the vinyl cyanide compounds include without limitation acrylonitrile, methacrylonitrile, and the like, and combinations thereof. In exemplary embodiments acrylonitrile can be used.

Examples of the aromatic vinyl compounds include without limitation styrene, alpha-methylstyrene, p-t-butylstyrene, 2,4-dimethylstyrene, chlorostyrene, vinyltoluene, vinylnaphthalene, and the like, and combinations thereof. In exemplary embodiments, styrene can be used.

Examples of the acrylic graft copolymer can include without limitation acrylonitrile-styrene-acrylonitrile-styrene-acrylate (ASA) graft copolymers. The acrylic graft copolymer can be used singly or as a combination of two or more acrylic graft copolymers.

ASA resins can be prepared by graft copolymerizing acrylonitrile and styrene to the acrylic rubber along with copolymerization of the acrylonitrile and styrene under normal copolymerization process conditions by adding acrylonitrile and styrene to acrylic rubber. This process can provide a resin with excellent weather resistance and chemical resistance as compared to ABS resin.

In this invention, the ASA resin composition can include the acrylic graft copolymer (A) in an amount of about 20 to about 50% by weight, based on the total weight of the acrylic graft copolymer (A), aromatic vinyl-vinyl cyanide copolymer (B), and alpha methyl styrene terpolymer (C). In some embodiments, the ASA resin composition can include the acrylic graft copolymer (A) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of acrylic graft copolymer (A) can be in a range from about any of the foregoing amounts to about any other of the foregoing amounts.

If the amount of acrylic graft copolymer (A) is greater than about 50% by weight, the heat resistance can be decreased. If the amount of acrylic graft copolymer (A) is less than about 20% by weight, weather resistance can be impaired.

(B) Two Types of Aromatic Vinyl-Vinyl Cyanide Copolymers Having Different Molecular Weights.

Each of the two types of aromatic vinyl-vinyl cyanide copolymers can be manufactured using conventional polymerization methods using about 20 to about 35% by weight of vinyl cyanide compound and about 65 to about 80% by weight of aromatic vinyl compound.

In some embodiments, the aromatic vinyl-vinyl cyanide copolymers can include vinyl cyanide compound in an amount of about 20, 21, 22, 23, 24, 25, 26, 27, 28, 29, 30, 31, 32, 33, 34, or 35% by weight. Further, according to some embodiments of the present invention, the amount of vinyl cyanide compound can be in a range from about any of the foregoing amounts to about any other of the foregoing amounts.

In some embodiments, the aromatic vinyl-vinyl cyanide copolymers can include aromatic vinyl compound in an amount of about 65, 66, 67, 68, 69, 70, 71, 72, 73, 74, 75, 76, 77, 78, 79, or 80% by weight. Further, according to some embodiments of the present invention, the amount of aromatic vinyl compound can be in a range from about any of the foregoing amounts to about any other of the foregoing amounts.

If the amount of vinyl cyanide compound is greater than about 35% by weight, thermochromic resistance can decrease. If the amount of vinyl cyanide compound is less than about 20% by weight, the chemical resistance can be hampered.

The aromatic vinyl-vinyl cyanide copolymer (B) includes a high molecular weight aromatic vinyl-vinyl cyanide copolymer (b1) and a low molecular weight aromatic vinyl-vinyl cyanide copolymer (b2).

The high molecular aromatic vinyl-vinyl cyanide copolymer (b1) can have a weight average molecular weight (Mw) of about 130,000 to about 150,000, and the low molecular weight aromatic vinyl-vinyl cyanide copolymer (b2) can have a weight average molecular weight (Mw) of about 80,000 to about 100,000. If the two types of aromatic vinyl-vinyl cyanide copolymers are used with weight average molecular weights within the above ranges, the ASA resin composition can have an excellent balance of processability, fluidity, and impact resistance.

The aromatic vinyl-vinyl cyanide copolymer (B) can include about 5 to about 95% by weight, for example about 20 to about 70% by weight, of the high molecular weight aromatic vinyl-vinyl cyanide copolymer (b1) having a weight average molecular weight (Mw) of about 130,000 to about 150,000 and about 5 to about 95% by weight, for example about 30 to about 80% by weight, of the low molecular weight aromatic vinyl-vinyl cyanide copolymer (b2) having a weight average molecular weight (Mw) of about 80,000 to about 100,000, based on the total weight of (B).

In some embodiments, the aromatic vinyl-vinyl cyanide copolymer (B) can include the high molecular weight aromatic vinyl-vinyl cyanide copolymer (b1) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the high molecular weight aromatic vinyl-vinyl cyanide copolymer (b1) can be in a range from about any of the foregoing amounts to about any other of the foregoing amounts.

In some embodiments, the aromatic vinyl-vinyl cyanide copolymer (B) can include the low molecular weight aromatic vinyl-vinyl cyanide copolymer (b2) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the low molecular weight aromatic vinyl-vinyl cyanide copolymer (b1) can be in a range from about any of the foregoing amounts to about any other of the foregoing amounts.

Examples of the vinyl cyanide compounds can include without limitation acrylonitrile, methacrylonitrile, and the like, and combinations thereof. In exemplary embodiments, acrylonitrile can be used.

Examples of the aromatic vinyl compounds can include without limitation styrene, alpha-methylstyrene, p-t-butylstyrene, 2,4-dimethylstyrene, chlorostyrene, vinyltoluene, vinylnaphthalene, and the like, and combinations thereof. In exemplary embodiments, styrene can be used.

The aromatic vinyl-vinyl cyanide copolymers can be styrene-acrylonitrile (SAN) resin which is well known to the persons of ordinary skill in the art.

The ASA resin composition can include the two types of aromatic vinyl-vinyl cyanide copolymers in an amount of about 20 to about 50% by weight, based on the total weight of the acrylic graft copolymer (A), aromatic vinyl-vinyl cyanide copolymer (B), and alpha methyl styrene terpolymer (C). In some embodiments, the ASA resin composition can include the two types of aromatic vinyl-vinyl cyanide copolymers in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the two types of aromatic vinyl-vinyl cyanide copolymers can be in a range from about any of the foregoing amounts to about any other of the foregoing amounts.

If the total amount of the two types of aromatic vinyl-vinyl cyanide copolymers is greater than about 50% by weight, weather resistance can be reduced. If the total amount of the two types of aromatic vinyl-vinyl cyanide copolymers is less than about 20% by weight, fluidity can be decreased.

(C) Alpha-methyl Styrene Terpolymer

The alpha-methyl styrene terpolymer is a terpolymer comprising vinyl cyanide compound-styrene-alpha methyl styrene, and can be copolymerized using about 20 to about 40% by weight of vinyl cyanide compound, about 10 to about 30% by weight of styrene, and about 40 to about 70% by weight of alpha-methyl styrene.

In some embodiments, the alpha-methyl styrene terpolymer can include vinyl cyanide compound in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide compound can be in a range from about any of the foregoing amounts to about any other of the foregoing amounts.

In some embodiments, the alpha-methyl styrene terpolymer can include styrene in an amount of about 10, 11, 12, 13, 14, 15, 16, 17, 18, 19, 20, 21, 22, 23, 24, 25, 26, 27, 28, 29, or 30% by weight. Further, according to some embodiments of the present invention, the amount of styrene can be in a range from about any of the foregoing amounts to about any other of the foregoing amounts.

In some embodiments, the alpha-methyl styrene terpolymer can include alpha-methyl styrene in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of alpha-methyl styrene can be in a range from about any of the foregoing amounts to about any other of the foregoing amounts.

Examples of the vinyl cyanide compounds can include without limitation acrylonitrile, methacrylonitrile, and the like, and combinations thereof. In exemplary embodiments, acrylonitrile can be used.

The ASA resin composition can include the alpha-methyl styrene terpolymer in an amount of about 30 to about 50% by weight, based on the total weight of the acrylic graft copolymer (A), aromatic vinyl-vinyl cyanide copolymer (B), and alpha methyl styrene terpolymer (C). In some embodiments, the ASA resin composition can include the alpha-methyl styrene terpolymer in an amount of about 30, 31, 32, 33, 34, 35, 36, 37, 38, 39, 40, 41, 42, 43, 44, 45, 46, 47, 48, 49, or 50% by weight. Further, according to some embodiments of the present invention, the amount of the alpha-methyl styrene terpolymer can be in a range from about any of the foregoing amounts to about any other of the foregoing amounts.

If the amount of alpha-methyl styrene terpolymer is greater than about 50% by weight, gas generation can be increased, and weather resistance and impact resistance can be decreased. If the amount of alpha-methyl styrene terpolymer is less than about 30% by weight, heat resistance can be reduced.

(D) Maleimide Based Heat Resistant Copolymer

The maleimide based heat resistant copolymer is a copolymer manufactured by copolymerizing aromatic vinyl monomer, vinyl cyanide monomer, and N-substituted maleimide monomer. In exemplary embodiments, the maleimide based copolymer can include maleic anhydride which has excellent reactivity.

Examples of the aromatic vinyl monomer include without limitation styrene, alpha-methylstyrene, p-t-butylstyrene, 2,4-dimethylstyrene, chlorostyrene, vinyltoluene, vinylnaphthalene, and the like, and combinations thereof. In exemplary embodiments, styrene can be used.

Examples of the vinyl cyanide monomer can include without limitation acrylonitrile, methacrylonitrile, and the like, and combinations thereof. In exemplary embodiments acrylonitrile can be used.

Examples of the N-substituted maleimide monomers can include without limitation N-methyl maleimide, N-ethyl maleimide, N-cyclohexylmaleimide, N-phenyl maleimide and the like, and combinations thereof. In exemplary embodiments, N-phenyl maleimide can be used.

The amount of N-substituted maleimide, aromatic vinyl monomer, and vinyl cyanide monomer can be changed as needed. In exemplary embodiments, the maleimide based heat resistant copolymer can include about 40 to about 60% by weight N-substituted maleimide, about 10 to about 50% by weight aromatic vinyl monomer, and about 10 to about 30% by weight vinyl cyanide monomer.

In some embodiments, the maleimide based heat resistant copolymer can include N-substituted maleimide in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the N-substituted maleimide can be in a range from about any of the foregoing amounts to about any other of the foregoing amounts.

In some embodiments, the maleimide based heat resistant copolymer can include aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of aromatic vinyl monomer can be in a range from about any of the foregoing amounts to about any other of the foregoing amounts.

In some embodiments, the maleimide based heat resistant copolymer can include vinyl cyanide monomer in an amount of about 10, 11, 12, 13, 14, 15, 16, 17, 18, 19, 20, 21, 22, 23, 24, 25, 26, 27, 28, 29, or 30% by weight. Further, according to some embodiments of the present invention, the amount of vinyl cyanide monomer can be in a range from about any of the foregoing amounts to about any other of the foregoing amounts.

If the amount of N-substituted maleimide is less than about 40% by weight, the glass transition temperature of the copolymer can be decreased, and therefore it may be difficult to effectively reinforce heat resistance. If the amount of N-substituted maleimide is greater than about 60% by weight, the glass transition temperature of the copolymer can become too high, and there can be difficulty in processing the composition using general extrusion methods.

The ASA resin composition can include the maleimide heat resistant copolymer (D) in an amount of about 5 to about 10 parts by weight, based on about 100 parts by weight of the combination of the acrylic graft copolymer (A), vinyl cyanide-aromatic vinyl copolymer (B), and alpha methyl styrene terpolymer (C). In some embodiments, the ASA resin composition can include the maleimide heat resistant copolymer (D) in an amount of about 5, 6, 7, 8, 9, or 10 parts by weight. Further, according to some embodiments of the present invention, the amount of maleimide heat resistant copolymer (D) can be in a range from about any of the foregoing amounts to about any other of the foregoing amounts.

If the amount of the maleimide heat resistant copolymer (D) is greater than about 10 parts by weight, impact resistance can be reduced. If the amount of the maleimide heat resistant copolymer (D) is less than about 5 parts by weight, there may be minimal or no improvement in heat resistance.

The ASA resin composition can optionally further include one or more additives. Examples of the additives include without limitation flame retardants, antibacterial agents, release agents, thermal stabilizers, antioxidants, light stabilizers, compatibilizers, inorganic additives, surfactants, nucleating agents, coupling agents, filling agents, plasticizers, impact reinforcing materials, admixtures, coloring agents such as dyes and/or pigments, lubricants, antistatic agents, and the like, and combinations thereof. The additives may be used in conventional amounts so long as the additives do not substantially negatively affect the properties of the ASA resin composition.

When a test specimen is made having a thickness of 2.2 mm, a width of 10 mm, and a length of 6 mm at a forming temperature of 250° C., a mold temperature of 70° C., and a cooling time of 300 seconds, and kept at a temperature of 250° C. for 10 minutes, and then measured for yellowness changes ($\Delta YI$) before and after being held at the temperature of 250° C. for 10 minutes, the ($\Delta YI$) value can be less than about 7.0.

The ASA resin composition can be prepared using conventional methods. For example, the ASA resin composition can be prepared by mixing the components discussed herein and optionally other additives using an extruder, kneader, mixer, or the like. Also, the ASA resin composition can be prepared using a method wherein after mixing, these components and optional additives can be mixed at the same time, then melted and extruded using an extruder to form pellets.

The ASA resin composition can be used to manufacture various molded products. These molded products can be used in various products such as but not limited to electrical/electronic products, automobile parts, general sundries, and the like. There is no specific limitation on the method used to prepare molded products using the ASA resin composition of the invention. Exemplary methods of production include without limitation extrusion, injection molding, casting, and the like. Suitable methods for making products using the ASA resin composition of the invention will readily understood by the skilled artisan without undue experimentation.

The following examples and comparative examples are provided for the purpose of exemplifying the invention and are not intended to limit the scope of protection of the invention.

EXAMPLES

The specifications of each component in the following examples and comparative examples are as given below.

(A) Acrylic Graft Copolymer (g-ASA)

An ASA copolymer with 58% by weight of butyl acrylate rubber with an average rubber particle size of 0.3 μm, 29.4% by weight of styrene and 12.6% by weight of acrylonitrile is used.

(A') Diene Series Graft Copolymer

To compare with the g-ASA (A), an ABS copolymer with 50% by weight butadiene rubber having an average rubber particle size of 0.4 μm, 15% by weight styrene, and 35% by weight acrylonitrile is used.

(B) Aromatic Vinyl-vinyl Cyanide Copolymer (b-1) Styrene-acrylonitrile (SAN) resin-1: high molecular weight SAN resin including 26% by weight acrylonitrile and a weight average molecular weight of 140,000 is used.

(b-2) SAN resin-2: Low molecular weight SAN resin including 26% by weight acrylonitrile and a weight average molecular weight of 90,000 is used.

(C) Alpha-methyl Styrene Terpolymer

Alpha-methyl styrene terpolymer copolymerized with 19% by weight styrene, 27% by weight acrylonitrile, and 54% by weight alpha-methyl styrene is used.

(C') Alpha-methyl Styrene Copolymer

To compare with (C) of the invention, a copolymer that is copolymerized with 30% by weight acrylonitrile and 70% by weight alpha-methyl styrene is used.

(D) Maleimide based heat resistant copolymer

A maleimide based heat resistant copolymer that is copolymerized with 50% by weight N-substituted malemide, 30% by weight styrene, and 20% by weight acrylonitrile is used.

Example 1

To 100 parts by weight of ASA resin composition comprising 30% by weight g-ASA, 10% by weight low molecular weight SAN, 10% by weight high molecular weight SAN, and 50% by weight α-methyl styrene terpolymer, 0.1 parts by weight antioxidant (Irganox 1076 (Ciba)), 0.3 parts by weight stabilizer (magnesium stearate), and 0.2 parts by weight carbon black are added and pellets are prepared using a twin screw extruder (L/D=32, Φ=45 mm) Test specimens with a thickness of 2.2 mm, a width of 10 mm, and a length of 6 mm are prepared to measure color. The physical properties of the specimens are also measured in accordance with the methods below, and the results are presented in Table 1.

Examples 2-3 and Comparative Examples 1-6

Test specimens for Examples 2-3 and Comparative Examples 1-6 are prepared using the same method as in Example 1, and the physical properties thereof are also measured and reported in Table 1.

Physical Property Measurement Methods (1) Notched Izod Impact strength (¼ inch, kgf·cm/cm): measured in accordance with ASTM D-256.

(2) Melt flow Index (g/10 min): measured in accordance with ISO 1103 at a temperature of 220° C. and 10 kg.

(3) Softening temperature (VST): measured in accordance with ASTM D306 (5 kg, 50° C./hr)

(4) Injection molding stability: A test specimen with a thickness of 2.2 mm, a width of 10 mm, and a length of 6 mm is prepared at a forming temperature of 250° C., a mold temperature of 70° C., and a cooling time of 300 seconds. The evaluation is performed by observing the specimen with the naked eye and the results are reported as noted below:

◉: Highly excellent, ○: Excellent, Δ: Normal, ×: Defective (5) Change in yellowness value (ΔYI): A test specimen with a thickness of 2.2 mm, a width of 10 mm, and a length of 6 mm is prepared at a forming temperature of 250° C., a mold temperature of 70° C., and a cooling time of 300 seconds, and is kept at a temperature of 250° C. for 10 minutes. Then the change in yellowness (ΔYI) before and after being kept at the temperature of 250° C. for 10 minutes is measured using a spectrocolorimeter in accordance with ASTM D-1925.

(6) Weather resistant property (3000 hr, dE): measured in accordance with SAE J 1960.

TABLE 1

| Category | Examples | | | Comparative examples | | | | | |
|---|---|---|---|---|---|---|---|---|---|
| Components | 1 | 2 | 3 | 1 | 2 | 3 | 4 | 5 | 6 |
| ASA copolymer (A) | 30 | 30 | 40 | 30 | 30 | — | — | 40 | — |
| ABS copolymer (A') | — | — | — | — | — | 30 | 30 | — | 40 |
| High molecular wt. SAN (b-1) | 10 | 10 | 10 | 10 | 10 | 10 | 10 | 10 | 10 |
| Low molecular wt. SAN (b-2) | 10 | 25 | 15 | 10 | 25 | 10 | 25 | 15 | 15 |
| α-methyl styrene copolymer (C) | 50 | 30 | 30 | — | — | — | — | — | — |
| (C') | — | — | — | 50 | 30 | 50 | 30 | 30 | 30 |
| Maleimide heat resistance copolymer (D) | — | 5 | 5 | — | 5 | — | 5 | 5 | 5 |
| Izod impact strength (¼") | 12 | 14 | 19 | 13 | 14.5 | 21 | 23 | 20 | 39 |
| MI (220° C., 3.8 kg) | 6 | 5 | 2.5 | 7 | 6 | 8 | 9 | 3 | 4.5 |
| VST (° C.) | 106 | 107 | 103 | 106 | 107 | 105 | 106 | 102 | 101 |
| Injection molding stability | ◉ | ◉ | ○ | Δ | Δ | Δ | Δ | ○ | X |
| ΔYI (maintained at 250° for 10 min.) | 6 | 4 | 6 | 10 | 8 | 14 | 11 | 12 | 13 |
| Weather resistance dE | 2 | 1.9 | 2.4 | 2 | 1.9 | 3.1 | 3 | 2.5 | 4 |

As can be seen from the above Table 1, the examples 1 to 3 exemplifying the invention exhibit smaller changes in yellowness values, excellent thermochromic resistance at high temperature, and injection molding stability without a reduction in the impact strength, fluidity, and weather resistance by introducing alpha-methyl styrene terpolymer.

In contrast, comparative examples 1-6 which used alpha-methyl styrene copolymer exhibit a larger change in yellowness value at a high temperature as well as reduced injection molding stability. Comparative examples 3, 4, and 6 exhibit excellent impact strength using ABS instead of ASA in this invention, but injection molding stability and weather resistance are decreased, particularly they exhibit a large yellowness difference.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An acrylate-aromatic vinyl-vinyl cyanide resin composition with thermochromic resistance at high temperature, comprising:
   (A) about 20 to about 50% by weight of acrylic graft copolymer,
   (B) about 30 to about 50% by weight of two types of aromatic vinyl-vinyl cyanide copolymers having different molecular weights, and
   (C) about 30 to about 50% by weight of alpha-methyl styrene terpolymer, wherein said alpha-methyl styrene terpolymer (C) is a vinyl cyanide compound-styrene-alpha-methyl styrene terpolymer and comprises about 20 to about 40% by weight of vinyl cyanide compound, about 15 to about 30% by weight of styrene monomer, and about 40 to about 65% by weight of alpha-methyl styrene.

2. The resin composition of claim 1, wherein said acrylic graft copolymer (A) comprises about 40 to about 60% by weight acrylic rubber and about 40 to about 60% by weight of monomer compounds including aromatic vinyl compound and vinyl cyanide compound.

3. The resin composition of claim 2, wherein the monomer compounds including vinyl cyanide compound and aromatic vinyl mixture comprises about 20 to about 30% by weight of vinyl cyanide compound and about 70 to about 80% by weight of aromatic vinyl compound.

4. The resin composition of claim 2, wherein the acrylic rubber comprises a C2 to C10 alkyl acrylate and has an average rubber particle size of about 0.1 to about 0.5 µm.

5. The resin composition of claim 2, wherein said aromatic vinyl compound comprises styrene, alpha-methylstyrene, p-methylstyrene, p-t-butylstyrene, 2,4-dimethylstyrene, chlorostyrene, vinyltoluene, vinylnaphthalene, or a combination thereof.

6. The resin composition of claim 2, wherein said vinyl cyanide compound comprises acrylonitrile, methacrylonitrile, or a combination thereof.

7. The resin composition of claim 1, wherein said acrylic graft copolymer (A) is acrylonitrile-styrene-acrylate (ASA) graft copolymer.

8. The resin composition of claim 1, wherein the two types of aromatic vinyl-vinyl cyanide copolymers (B) comprise about 20 to about 35% by weight of vinyl cyanide compound and about 65 to about 80% by weight of aromatic vinyl compound.

9. The resin composition of claim 8, wherein said aromatic vinyl-vinyl cyanide copolymer (B) comprises (b1) a high molecular weight aromatic vinyl-vinyl cyanide copolymer having a weight average molecular weight (Mw) of about 130,000 to about 150,000 and (b2) a low molecular weight aromatic vinyl-vinyl cyanide copolymer having a average molecular weight (Mw) of about 80,000 to about 100,000.

10. The resin composition of claim 8, wherein said aromatic vinyl compound comprises styrene, alpha-methylstyrene, p-methylstyrene, p-t-butylstyrene, 2,4-dimethylstyrene, chlorostyrene, vinyltoluene, vinylnaphthalene, or a combination thereof, and said vinyl cyanide compound comprises acrylonitrile, methacrylonitrile, or a combination thereof.

11. The resin composition of claim 1, further comprising about 5 to about 10 parts by weight of a maleimide heat resistant copolymer (D), based on about 100 parts by weight of a base resin comprising said acrylic graft copolymer (A), aromatic vinyl-vinyl cyanide copolymer (B) and alpha-methyl styrene terpolymer (C).

12. The resin composition of claim 11, wherein said maleimide heat resistant copolymer comprises a copolymer comprising aromatic vinyl monomer, vinyl cyanide monomer, and N-substituted maleimide monomer.

13. The resin composition of claim 1, wherein the composition has a change in yellowness value (ΔYI) of less than about 7.0 measured using a spectrocolorimeter in accordance with ASTMD-1925, wherein the yellowness value of a specimen of the composition is measured before and after the specimen is maintained at a temperature of 250° C. for 10 min., wherein the specimen has a thickness of 2.2 mm, a width of 10 mm, and a length of 6 mm prepared at a forming temperature of 250° C., a mold temperature of 70° C., and a cooling time of 300 seconds.

14. An acrylate-aromatic vinyl-vinyl cyanide resin composition with thermochromic resistance at high temperature, comprising:
   (A) about 20 to about 50% by weight of acrylic graft copolymer,
   (B) about 30 to about 50% by weight of two types of aromatic vinyl-vinyl cyanide copolymers having different molecular weights, and
   (C) about 30 to about 50% by weight of alpha-methyl styrene terpolymer, and
   (D) about 5 to about 10 parts by weight of a maleimide heat resistant copolymer (D), based on about 100 parts by weight of a base resin comprising said acrylic graft copolymer (A), aromatic vinyl-vinyl cyanide copolymer (B) and alpha-methyl styrene terpolymer (C), wherein said maleimide heat resistant copolymer comprises a copolymer comprising aromatic vinyl monomer, vinyl cyanide monomer, and N-substituted maleimide monomer.

* * * * *